United States Patent
Shin et al.

(10) Patent No.: US 12,225,044 B2
(45) Date of Patent: Feb. 11, 2025

(54) AUTOMATED CAN MESSAGE TRANSLATOR

(71) Applicant: THE REGENTS OF THE UNIVERSITY OF MICHIGAN, Ann Arbor, MI (US)

(72) Inventors: Kang G. Shin, Ann Arbor, MI (US); Mert Dieter Pese, Howell, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 323 days.

(21) Appl. No.: 17/763,755

(22) PCT Filed: Sep. 26, 2020

(86) PCT No.: PCT/US2020/052954
§ 371 (c)(1),
(2) Date: Mar. 25, 2022

(87) PCT Pub. No.: WO2021/062328
PCT Pub. Date: Apr. 1, 2021

(65) Prior Publication Data
US 2022/0303305 A1    Sep. 22, 2022

Related U.S. Application Data

(60) Provisional application No. 62/934,246, filed on Nov. 12, 2019, provisional application No. 62/907,212, filed on Sep. 27, 2019.

(51) Int. Cl.
*H04L 9/40* (2022.01)
*H04L 12/40* (2006.01)
*H04L 67/12* (2022.01)

(52) U.S. Cl.
CPC .... *H04L 63/1441* (2013.01); *H04L 12/40032* (2013.01); *H04L 63/1416* (2013.01); *H04L 67/12* (2013.01); *H04L 2012/40215* (2013.01)

(58) Field of Classification Search
CPC ............. H04L 63/1441; H04L 63/1416; H04L 12/40032; H04L 67/12; H04L 2012/40215
See application file for complete search history.

(56) References Cited

U.S. PATENT DOCUMENTS 9,906,545 B1 *    2/2018    Zhao ................... H04L 63/1425
2003/0052801 A1   3/2003    McClure et al.
(Continued)

FOREIGN PATENT DOCUMENTS

| CN | 103217956 A | 7/2013 |
|----|-------------|--------|
| CN | 104156565 A | 11/2014 |

(Continued)

OTHER PUBLICATIONS

Pese et al., "LibreCAN: Automated CAN Message Translator", CCS'19 Nov. 2019, pp. 2283-2300 (Year: 2019).*

(Continued)

*Primary Examiner* — Hee K Song
(74) *Attorney, Agent, or Firm* — Harness, Dickey & Pierce, P.L.C.

(57) ABSTRACT

One commonality among most vehicular security attacks reported to date is that they ultimately require write access to the CAN bus. In order to cause targeted and intentional changes in the vehicle behavior, malicious CAN injection attacks require knowledge of the CAN message format. However, since this format is proprietary to OEMs and can differ even among different models of a single make of vehicle, one must manually reverse-engineer the CAN message format of each vehicle they target. To mitigate this difficulty, an automated CAN message translator is presented.

13 Claims, 7 Drawing Sheets

(56) References Cited

U.S. PATENT DOCUMENTS

Figure 1:
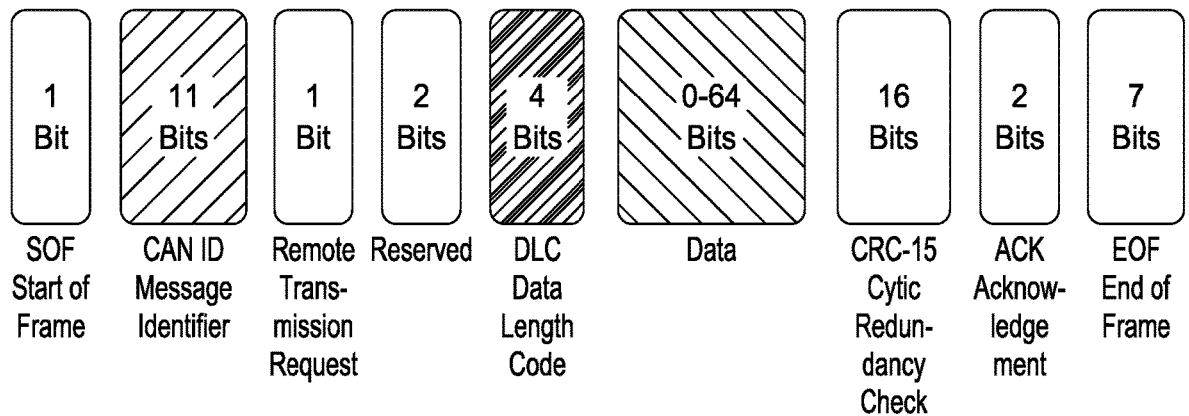

| | | |
|---|---|---|
| 2009/0192662 A1 | 7/2009 | Faus et al. |
| 2010/0158045 A1 | 6/2010 | Shin et al. |
| 2014/0215491 A1* | 7/2014 | Addepalli ............. H04W 76/45 |
| | | 719/313 |
| 2015/0371457 A1* | 12/2015 | Bakfan ................ G07C 5/0841 |
| | | 701/29.3 |
| 2017/0093659 A1 | 3/2017 | Elend et al. |
| 2017/0300444 A1* | 10/2017 | Maletsky .......... H04L 12/40013 |
| 2022/0303362 A1* | 9/2022 | Kamir ..................... G06F 13/36 |

FOREIGN PATENT DOCUMENTS

| | | |
|---|---|---|
| CN | 107547441 A | 1/2018 |
| WO | WO-2018067227 A1 | 4/2018 |

OTHER PUBLICATIONS

International Search Report and Written Opinion regarding International Application No. PCT/US20/52954, dated Jan. 5, 2021.
Marchetti, Micro et al., "Read: Reverse Engineering of Automotive Data Frames", IEEE Transactions on Information Forensics and Security, vol. 14, No. 4, Apr. 2019.

* cited by examiner

STAGE 1: Constant Messages
STAGE 2: Reference Messages
STAGE 3: Powertrain Messages

| TRACE | | | |
|---|---|---|---|
| TIME | ID | PAYLOAD | FILTERED IN |
| 00.000 | 700 | 1111111100000000 | STAGE 3 |
| 00.001 | 100 | 0000000000000000 | CANDIDATE |
| 00.002 | 300 | 000002000E20BE20 | STAGE 1 |
| 00.004 | 900 | FFFFFFFFFFFFFFFF | CANDIDATE |
| 00.008 | 300 | 000002000E20BE20 | STAGE 1 |
| 00.009 | 300 | 000002000E20BE20 | STAGE 1 |
| 00.011 | 600 | 000000024CB016EA | STAGE 2 |
| 00.015 | 800 | 00000000075BCD15 | CANDIDATE |
| 00.016 | 500 | 0000000000000000 | STAGE 3 |
| 00.018 | 400 | 056089000A00A000 | STAGE 2 |
| 00.020 | 200 | 0000000000000000 | CANDIDATE |

| REFERENCE | |
|---|---|
| ID | PAYLOAD |
| 100 | 0000A00A000BC300 |
| 200 | 0070070070070070 |
| 300 | 00000000075BCD15 |
| 400 | 056089000A00A000 |
| 500 | 0012300AE0030000 |
| 600 | 000000024CB016EA |
| 700 | 1000000001100001 |
| 800 | 00000000000000FF |
| 900 | 0F00B9900A0A0F0E |

| POWERTRAIN | |
|---|---|
| ID | CORRELATION SCORE |
| 100 | 0.7433 |
| 200 | 0.5192 |
| 300 | 0.7990 |
| 400 | 0.6648 |
| 500 | 0.9882 |
| 600 | 0.7102 |
| 700 | 0.8361 |
| 800 | 0.1034 |
| 900 | 0.2023 |

*Fig-9*

Experience-time correlation

Key metrics

AUTOMATED CAN MESSAGE TRANSLATOR

CROSS-REFERENCE TO RELATED APPLICATION

This application is a 371 U.S. National Phase of International Application PCT/US2020/052954, filed on Sep. 26, 2020, which claims the benefit of U.S. Provisional Application No. 62/907,212, filed on Sep. 27, 2019 and U.S. Provisional Application No. 62/934,246 filed on Nov. 12, 2019. The entire disclosures of the above applications are incorporated herein by reference.

FIELD

The present disclosure relates to an automated message translator for messages sent over a vehicle network, such as CAN.

BACKGROUND

Nearly all functions inside a modern vehicle, even in more traditionally mechanical domains like the powertrain, are controlled electronically. Moreover, purely electronic systems have become more prevalent as the number of sensors present in a vehicle has increased, particularly given the rise of advanced driver assistance (ADAS) systems. All of these systems are controlled by electronic control units (ECUs), embedded microprocessors that interface between a given system and the rest of the vehicle. Over the last few years, the number of ECUs inside a vehicle has increased significantly. Compared to the early 1990s, when few ECUs were present in a given vehicle, a modern vehicle features more than 40 ECUs (as of 2015 in Europe). Meanwhile, premium cars can be equipped with up to approximately 100 ECUs. These ECUs need to communicate over a unified communications network that is sophisticated and robust enough to handle all network traffic inside a vehicle, particularly for time-critical information. To meet this need, Bosch introduced the Controller Area Network (CAN) technology in 1987, which has since become the de facto standard automotive bus system.

Data security and privacy are among the most critical drivers and inhibitors of next-generation mobility services. Automotive cybersecurity is a relatively young field, with the first major publications appearing in 2010. In 2015, several attacks were reported, including three major wireless attacks: an attack on BMW Connected Drive, an attack on GM OnStar, and the Tesla Door Attack. Although the first two attacks received some attention, it was not until Miller and Valasek's Jeep attack that automotive cybersecurity was perceived as a mainstream research and engineering issue. This attack exploited vulnerabilities in the wireless Telematic Control Unit (TCU) and In-Vehicle Infotainment (IVI) system to allow for remote control of a vehicle. In the first-generation of automotive security research, attacks were mounted through vehicles' physical interfaces, e.g., through the OBD-II port or wired interfaces on the IVI. Meanwhile, remote or "wireless" attacks exploit wireless interfaces, such as the Bluetooth, Wi-Fi, or cellular connections of the TCU, as in the aforementioned Jeep attack.

A commonality between wired and wireless attacks is the need to eventually inject messages onto the CAN bus in order to make the vehicle act in an undesired or unexpected way. Even in the sophisticated Jeep attack, the researchers had to manually reverse-engineer portions of the CAN bus protocol in order to gain remote control over the vehicle, e.g., over its steering control. This is a very tedious process and is not scalable. Additionally, these attacks can usually only target a specific model or make of vehicle since message semantics are OEM-proprietary and can even differ from model to model of the same vehicle make. Academic offensive automotive cybersecurity research suffers greatly from this lack of scalability. Although most defensive solutions, such as intrusion detection systems (IDS), do not require knowledge of the message semantics of a vehicle, a straightforward and automated mechanism to reverse-engineer CAN bus data could greatly accelerate vulnerability research and allow software patches to be distributed before malicious entities become aware of vulnerabilities.

The current security through obscurity paradigm pursued by OEMs attempts to prevent wide-scale automotive attacks by keeping CAN message translation tables, called DBC files, secret (and therefore placing an additional barrier to vehicle hacking) is outdated and infeasible. Vehicles should be secure by design and not by choice, following Kerckhoffs's principle. Therefore, automotive Electrics/Electronics (E/E) architectures and networks should be resilient against CAN injection attacks originating from external sources, e.g., by firewalling messages from the OBD-II port, and without making assumptions about the knowledge of an attacker. In this disclosure, a tool to automatically translate most CAN messages with minimal effort is presented and is referred to herein as LibreCAN. Unlike prior limited research on automated CAN reverse-engineering, the LibreCAN translator not only focuses on powertrain-related data available through the public OBD-II protocol, but also leverages data from smartphone sensors, and furthermore reverse-engineers body-related CAN data. The LibreCAN translator is the first system that can reverse-engineer a relatively complete CAN communication matrix for any given vehicle, as well as the full-scale experimental evaluation of such a system.

This section provides background information related to the present disclosure which is not necessarily prior art.

SUMMARY

This section provides a general summary of the disclosure, and is not a comprehensive disclosure of its full scope or all of its features.

A computer-implemented method is presented for translating messages sent over a vehicle network. The method includes: receiving raw data sent over the vehicle network during a monitoring period; partitioning the raw data into a plurality of messages, where each message in the plurality of messages includes a message identifier; grouping the plurality of messages into multiple message groups, where each message group includes messages with a unique message identifier amongst the plurality of message groups; receiving tagged data sent over the vehicle network during the monitoring period, where the tagged data includes an identifier for a given vehicle parameter and is formatted in accordance with a standardized protocol; determining a similarity measure between the tagged data and each message group in the plurality of message groups; identifying one or more message groups in the plurality of message groups having a high correlation with the tagged data; and determining a data format for the given vehicle parameter in the plurality of messages from the one or more identified message groups.

In one embodiment, the similarity measure between the tagged data and each message group in the plurality of message groups is determined using cross-correlation.

Prior to the step of determining the similarity measure, the tagged data may be temporally aligned with the plurality of message groups.

Message groups may be identified by arranging the message groups in the plurality of message groups in a descending order according the similarity measures for the message groups; and selecting the one or more message groups with the highest similarity measures, such that a cutoff for the one or more message groups occurs where a difference between similarity measures for adjacent message groups exceeds a threshold.

In some embodiments, a data format for the given vehicle parameter is determined using linear regression, such that the data format for the given vehicle parameter includes a scale and an offset.

In another aspect, a computer-implemented method is presented for identifying message identifiers associated with a particular vehicle function. The method includes: capturing reference data sent over a vehicle network of a vehicle while an engine of the vehicle is off and no vehicle functions are performed in the vehicle; partitioning the reference data into a plurality of reference messages to form a reference state, where each message in the plurality of reference messages includes a message identifier and payload data; capturing event data sent over the vehicle network while a particular vehicle function is performed in the vehicle and an engine of the vehicle is off; partitioning the event data into a plurality of candidate messages, where each message in the plurality of candidate messages includes a message identifier and payload data; removing candidate messages from the plurality of candidate messages, where the payload data from the candidate messages removed from the plurality of candidate messages matches payload data for at least one of the references messages in the plurality of references messages; identifying additional candidate messages in the plurality of candidate messages, where the message identifier and the payload data is the same amongst the additional candidate messages; removing additional candidate messages from the plurality of candidate messages; and associating message identifiers for messages remaining in the plurality of candidate message with the particular vehicle function.

Example vehicle functions may include but are not limited to lock driver door, unlock driver door, lock passenger door, unlock passenger door, open driver door window, close driver door window, open passenger door window, close passenger door window, right turn signal on, right turn signal off, left turn signal on, left turn signal off, headlights on, headlights off, open hood, and open trunk.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
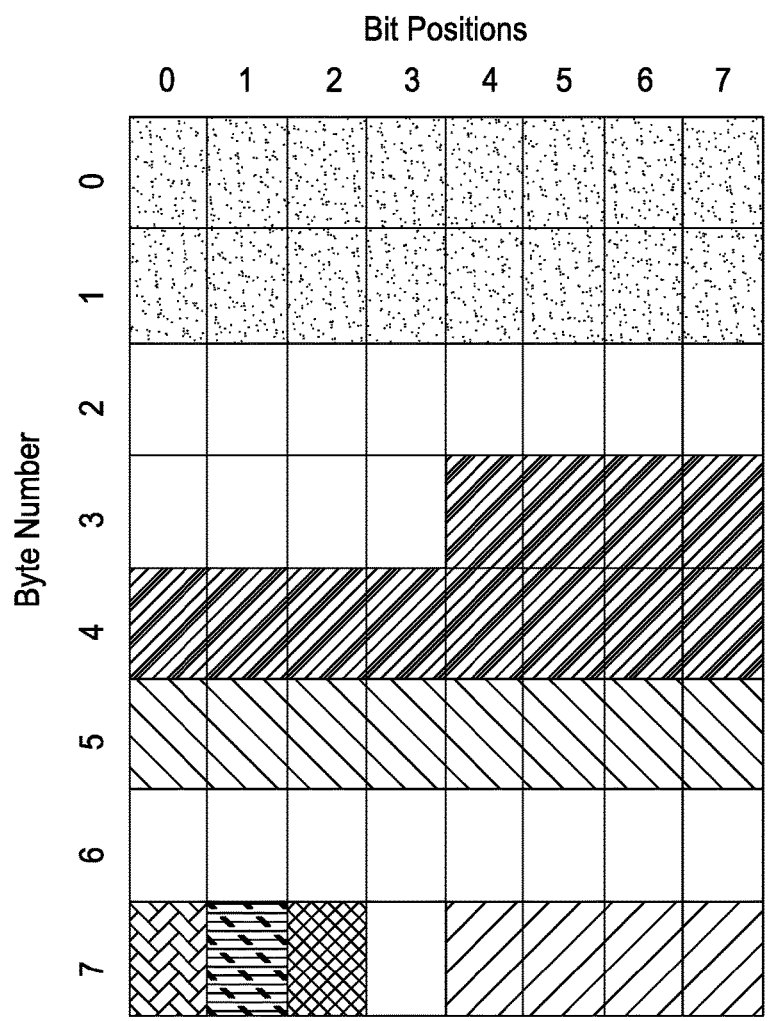
Figure 3:
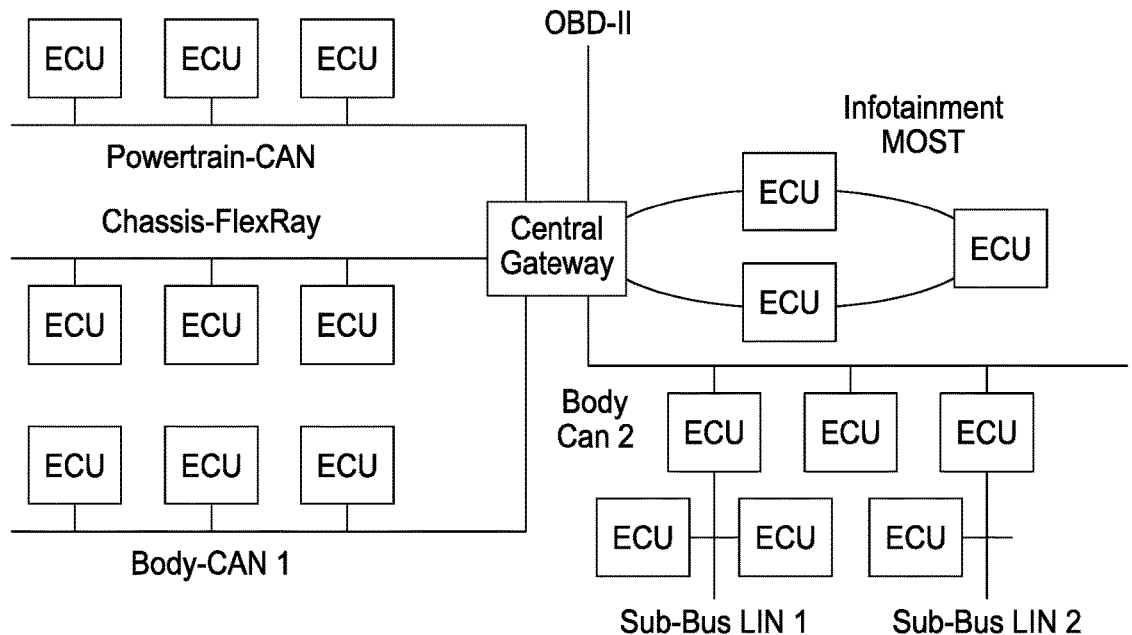
Figure 4:
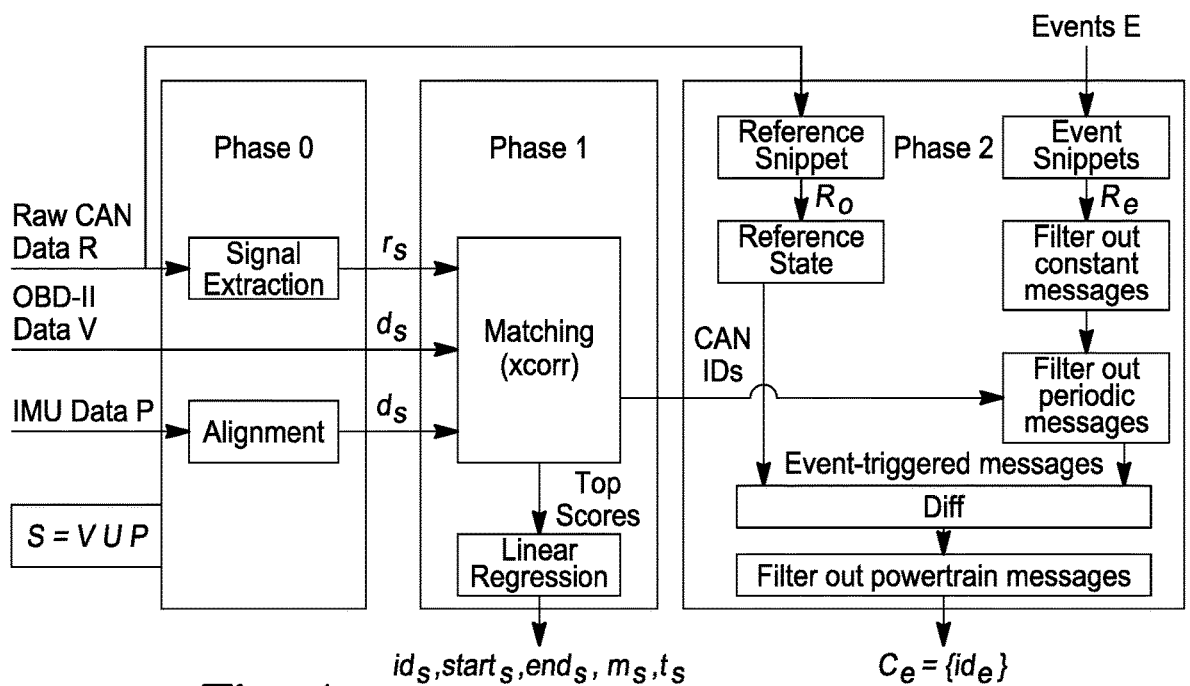
Figure 5:
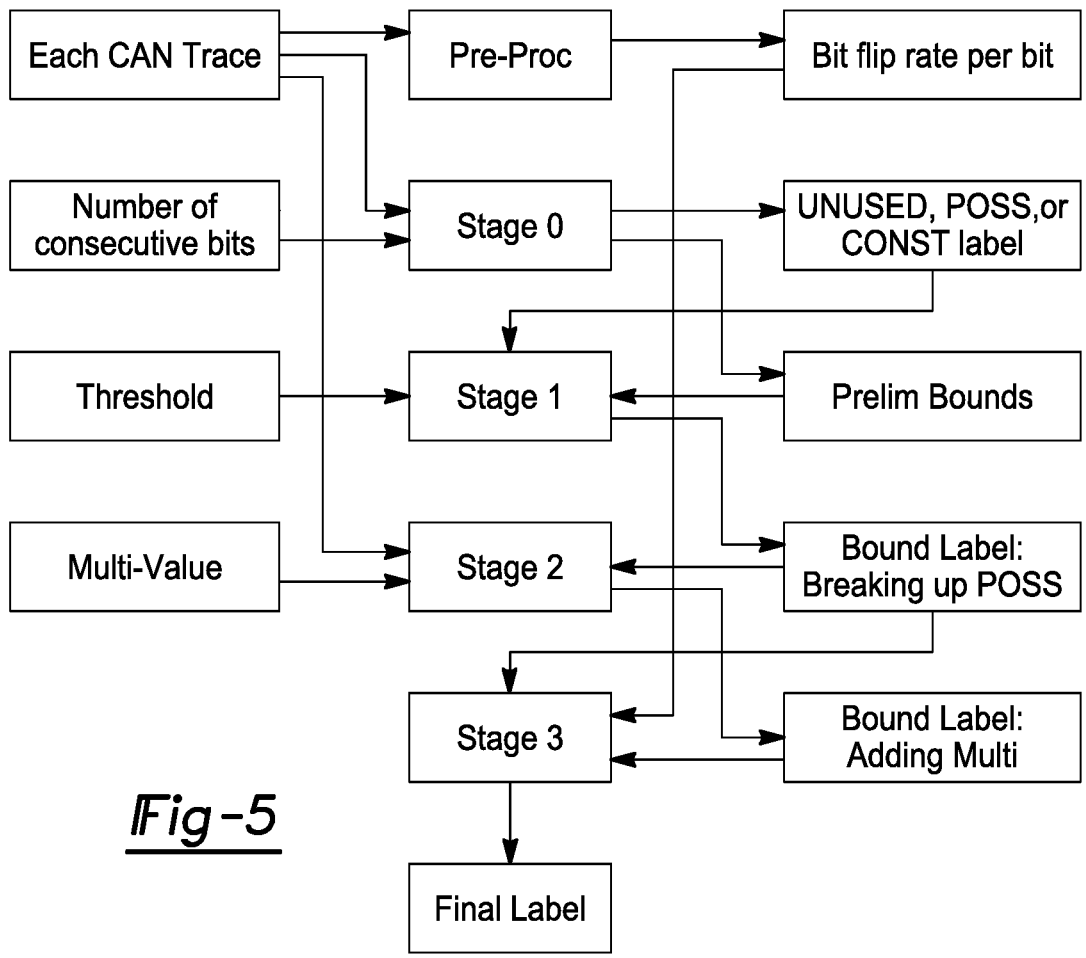
Figure 6:
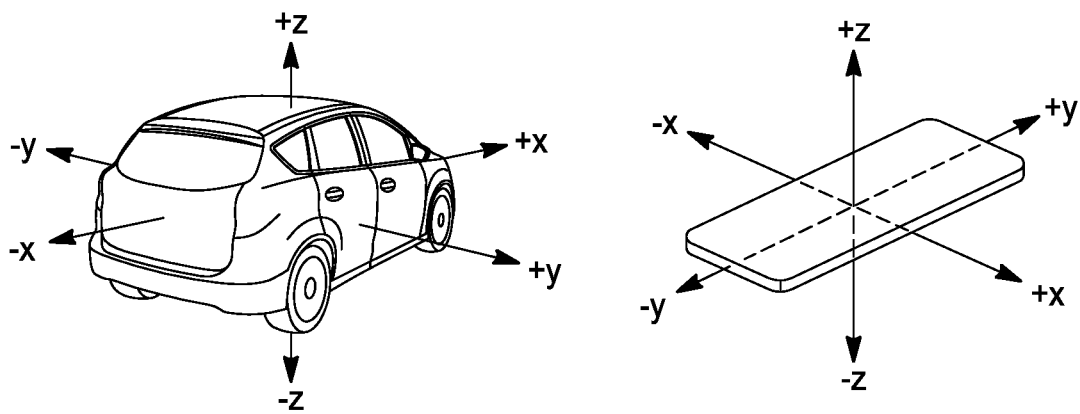
Figure 7:
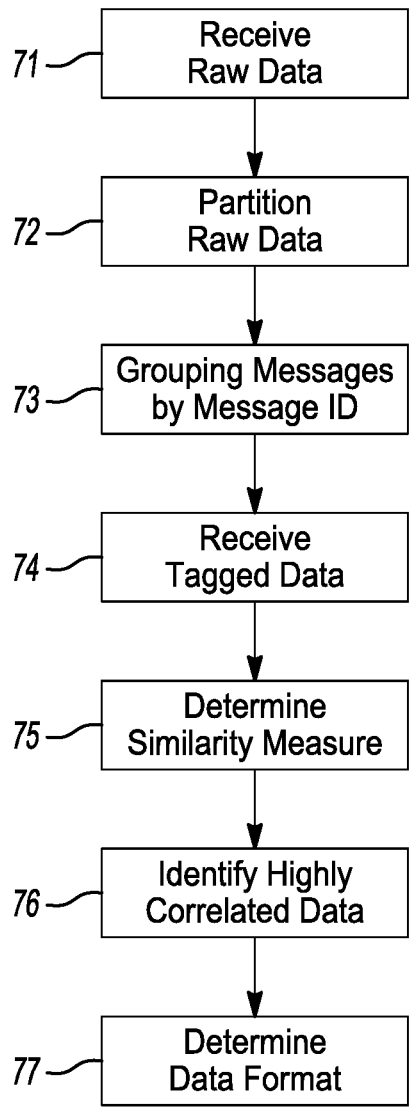
Figure 8:
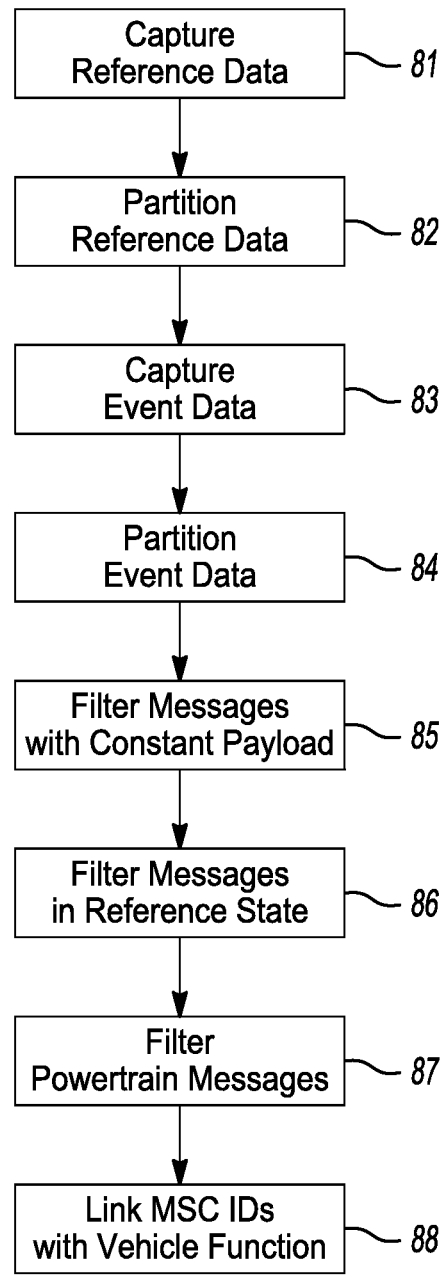
Figure 10:
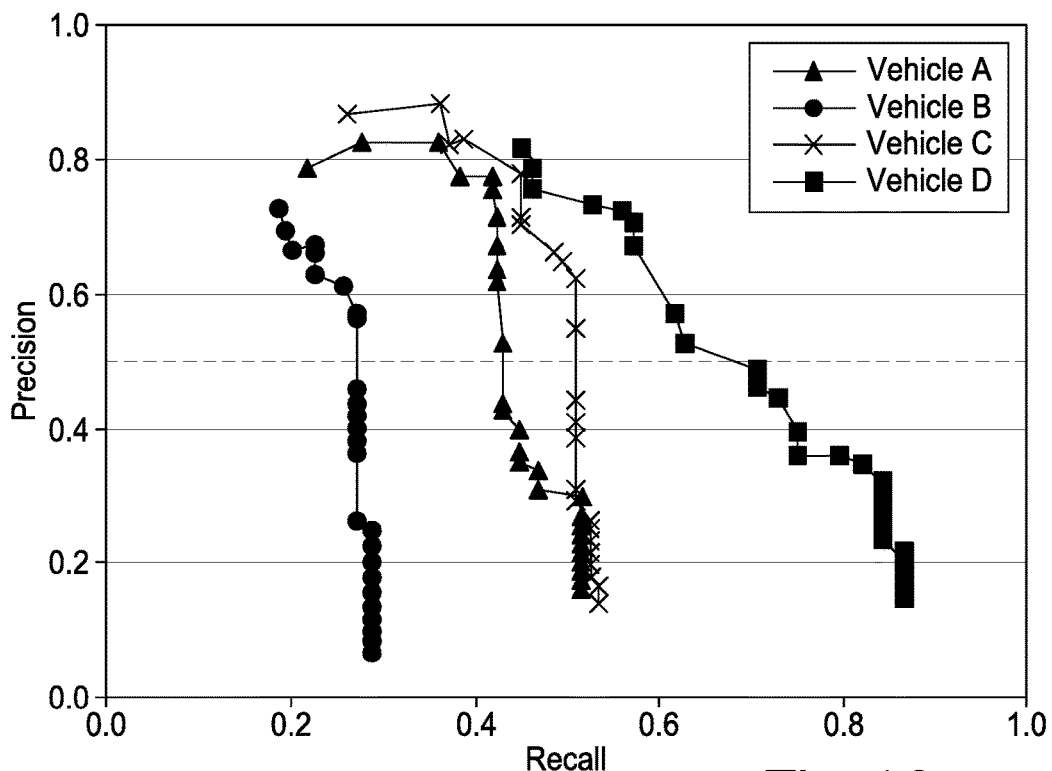
Figure 11:
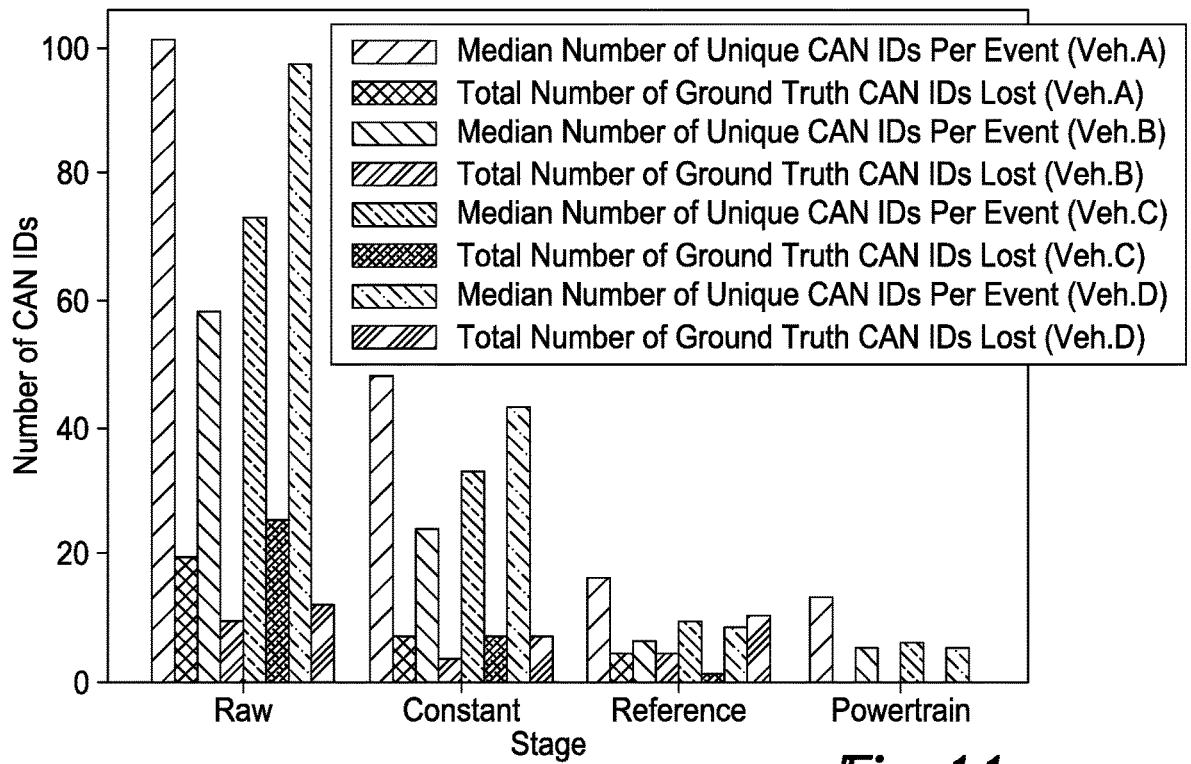
Figure 12:
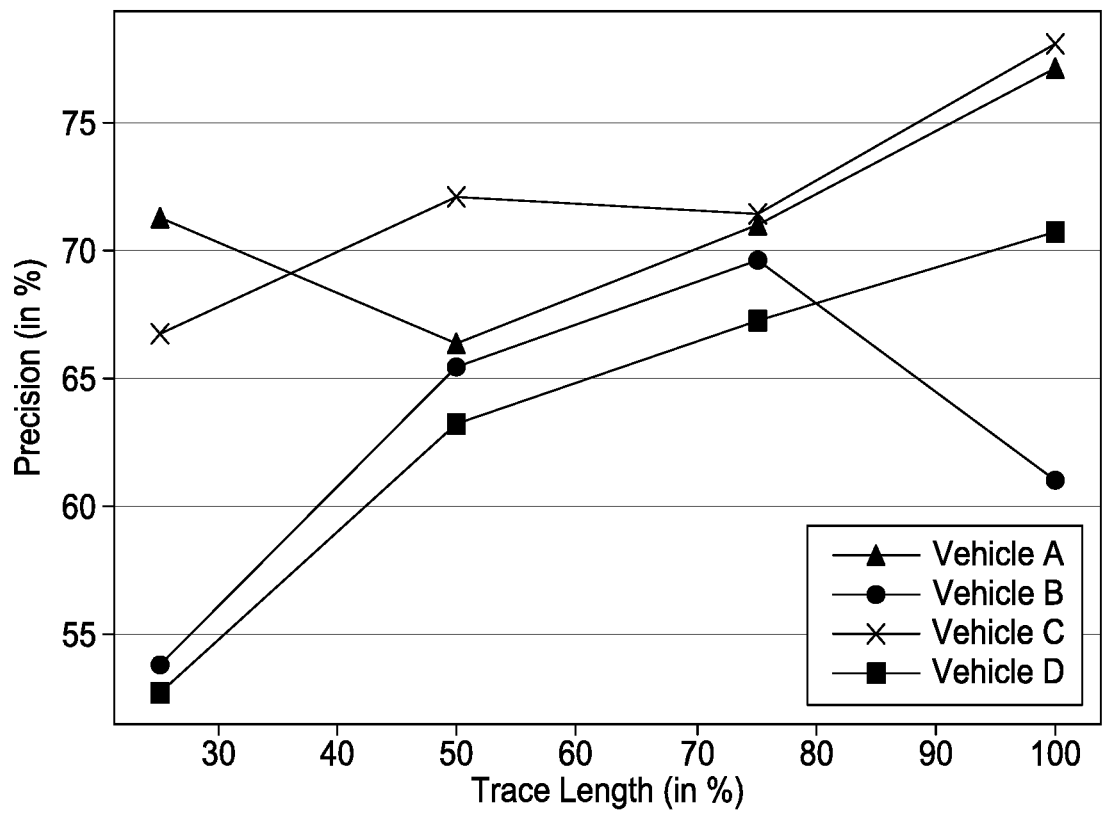
Figure 13A:
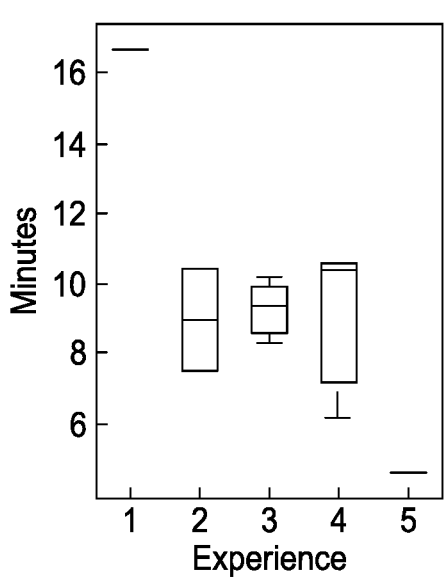
Figure 13B:
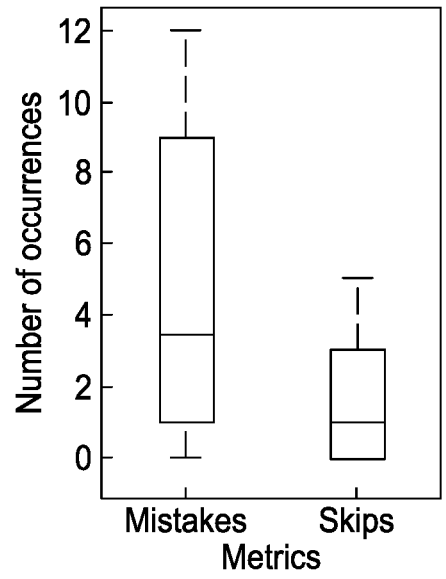

FIG. 1 illustrates a CAN data frame structure;
FIG. 2 depicts an example of CAN signals;
FIG. 3 is a diagrams of a typical automotive E/E architecture;
FIG. 4 is a diagram showing an overview of the LibreCAN system design;
FIG. 5 is a flowchart for the phase 0 algorithm;
FIGS. 6A and 6B depict the alignment of a phone's coordinate system with a vehicle coordinate system;
FIG. 7 is a flowchart depicting a method for translating message which may be implemented in phase 1;
FIG. 8 is a flowchart depicting an example filtering process in phase 2;
FIG. 9 illustrates a filtering example for the phase 2 algorithm;
FIG. 10 is a graph showing the precision-recall curve for the phase 1 algorithm;
FIG. 11 is a graph showing the filtering out of CAN IDs in each stage;
FIG. 12 is a graph showing the precision of the phase 1 algorithm with varying trace lengths; and
FIGS. 13A and 13B are graphs showing the results in a user-study experiment.

Corresponding reference numerals indicate corresponding parts throughout the several views of the drawings.

DETAILED DESCRIPTION

Example embodiments will now be described more fully with reference to the accompanying drawings.

Vehicular sensor data is collected from ECUs located within the vehicle. These ECUs are typically interconnected via an on-board communication bus, or in-vehicle network (IVN), with the CAN bus being the most widely-deployed technology in current vehicles. FIG. 1 depicts the structure of a CAN 2.0A data frame 10—the most common data frame type used on the CAN bus. The CAN data frame 10 includes a start of frame (SOF) field 11, a message identifier (CAN ID) field 12, a remote transmission request field 13, a data length code (DLC) field 14, the payload data 15, the cyclic redundancy check field 16, an acknowledgement field 17 and an end of frame field 18. The CAN ID, DLC and payload data fields are further discussed below. While reference is made to CAN, it is readily understood that the techniques presented in this disclosure are applicable to other types of vehicle networks and communication protocols thereof.

CAN is a multi-master, message-based broadcast bus. Unlike better known socket-based communication protocols like Ethernet, CAN is message-oriented, i.e., CAN message frames do not contain any information concerning their source or destination ECUs, but instead each frame carries a unique message identifier (ID) that represents its meaning and priority. Lower CAN IDs have higher priority (e.g., powertrain-vs. body-related information) and will "win" the distributed arbitration process that occurs when multiple messages are sent on the CAN bus at the same time. It is possible for the same ECU to send and/or receive messages with different CAN IDs. The basic CAN ID in the CAN 2.0A specification is 11 bits long and thus allows for up to 2048 different CAN IDs.

Data length code (DLC) specifies the number of bytes in the payload (data) field of the message. The DLC field 14 is four bits long and can specify a payload length from 0 to 8 bytes. The payload data field 15 of a CAN message containing the actual message data. It can contain 0-8 bytes of data depending on the value of the DLC field.

Next, the structure of a data payload field which includes one or more "signals" is described. A "signal" is a piece of information transmitted by an ECU, such as vehicle speed. Messages transmitted with the same CAN ID usually contain related signals (within the same domain) so that the destination ECU needs to receive and process fewer messages. For instance, a message destined for the Transmission Control Module (TCM) might contain both the vehicle speed (m/s) and engine speed (RPM) signals in one CAN message. The length and number of signals vary with CAN ID and are defined in the aforementioned DBC file for the corresponding vehicle. This translation file specifies the start position and length of a signal, allowing it to be easily retrieved from the payload using a bitmask if the DBC file is available.

Moreover, signals can not only contain physical information, but also other types of information, such as: constants; multi-values; counters and checkcodes. Constants are values that do not change over time. Multi-values are values with a domain consisting of only a few constant values, where two to three changing values are typically reported inside these types of signals. An example of a 2-value field could be the status of a specific door (e.g., open or closed). Counters are signals that behave as cyclic counters within a specific range. These signals could serve as additional syntax checks or be intended to order longer signal data at the destination ECU(s). Besides the CRC-15 field at the tail of every CAN frame, the payload can also contain additional checkcodes, typically as the last signal in the payload.

A contrived example is given in FIG. 2 showing multiple signals of different types (physical signals, multi-values, counters, CRCs, etc.) embedded in the 8-byte payload of a CAN message. For instance, the top row rows represents a 2-byte physical signal, part of the third row and the fourth row represents a 12-bit counter, and the fifth row represents another 1-byte long physical signal. Several CAN IDs also contain 1-bit signals that are multi-values, i.e., booleans that describe a body-related event (e.g., door is open/closed). Three status flags are depicted in byte 7 of this example. The remaining bits of byte 7 represents is a 4-bit checksum. Unshaded regions are unused, i.e., no signals are defined in the DBC file. CAN signals are defined by the OEM and can thus have arbitrary lengths. Some OEMs also decide not to include specific signal types. For instance, none of the evaluation vehicles (all from the same OEM) contain checksums.

All recorded CAN data can only be interpreted if one possesses the translation tables for that particular vehicle. These tables can come in different formats, as there is no single standard. Examples formats include KCF (Kayak) and ARXML (AUTOSAR) files. However, the most common format used for this purpose is DBC, a standard created by German automotive supplier company Vector Informatik. Although referenced herein, the techniques described herein are not limited to this particular data format.

DBC files contain a myriad of information. However, to understand this disclosure, one must be aware of the following information stored in these files. Message structure by type: CAN ID, Name, DLC, Sender; and signals located within messages, containing Name, Start Bit, Length, Byte Order, Scale, Offset, Minimum/Maximum Value, Unit, Receiver The representation of translation data in DBC files can be con-fusing. CAN data can be represented in either big endian (Motorola) or little endian (Intel) byte-order. The bits can also be numbered using either MSB0 (most significant bit first) or LSB0 (least significant bit first). However, most DBC files use the Intel format with LSB0 numbering. Therefore, the start bit included in the signal information does not describe the actual start bit. Since one need to know the actual signal boundaries, one need to calculate the true start bits so that we can, combined with the signal length l, obtain the signal end bit e:

$$s = \left\lfloor \frac{s}{8} \right\rfloor + 7 - (s \ \%8), \quad (1)$$
$$e = s + l - 1.$$

In order to know which data to reverse-engineer, one must first determine the information commonly available in vehicles. This depends greatly upon the age and price of the vehicle, and can drastically differ even among comparable vehicles from different OEMs. As a result, one must first establish a basic knowledge of the most frequently deployed ECUs in vehicles and the signals that they transmit on the CAN bus.

It is difficult to arrive at a deterministic answer to this question since this information is only located in DBC files, which are proprietary to the OEMs. As a result, reverse-engineering all signals present in a vehicle is nearly impossible. Thus, one goal of this disclosure is to reverse-engineer the most common subset of vehicular signals that are of interest to both security researchers and third-party app developers. After analyzing multiple sources, a list of ECUs typically present in a vehicle was derived (each of which usually transmits data using one or more CAN message IDs), along with the signals present in their respective CAN messages (see, Table 8 in Appendix A).

Raw CAN data is not encoded in a human-readable format and does not reflect the actual sensor values. In order to obtain the actual sensor values, raw CAN data must first be decoded. Letting $r_s$, $m_s$, $t_s$, and $d_s$ be the raw value, scale, offset, and decoded value of sensor s, respectively; the actual value can be found with the following equation:

$$d_s = m_s \cdot r_s + t_s. \quad (2)$$

There are four major bus systems used in cars: CAN, FlexRay, LIN, and MOST. The latter is used for multimedia transmission; whereas, the other bus types are mostly used for control tasks, e.g., in the powertrain domain. The most widely used in-vehicle network (IVN) architecture is the central gateway architecture. An overview of the buses and their interconnection within a vehicle is shown in FIG. 3.

The major point of entry into a vehicle for data collection (and diagnostics) is the on-board diagnostics (OBD-II) interface. This connector is mandatory for all vehicles sold in the US after 1996.

Generic sensors, such as vehicle speed, engine speed, intake temperature, mass airflow, etc., are universally available in all vehicles (after 1996) via the standardized OBD-II protocol. Apart from the standardized OBD-II protocol (called SAE J/1979), this port can also be used to both read and write raw CAN data. Note that the OBD-II protocol and OBD-II interface are different and should not be confused.

OBD-II data can be accessed by anyone through aftermarket dongles. The OBD-II protocol uses the CAN bus at the physical layer in all newer vehicles. It is a request-response protocol that sends requests on CAN ID 0x7E0 and obtains responses on 0x7E8. For instance, to obtain the vehicle speed, a dongle connected to the OBD-II port sends a CAN message with ID 0x7E0 and payload 0x02010D5555555555. The first byte (0x02) indicates that 2 more bytes will follow, the second byte (0x01) corresponds to the OBD mode of getting live data, and 0x0D indicates vehicle speed. Unused bytes are set to 0x55 ("dummy load") and ignored. A complete specification is available, for example in Wikipedia.

Note that the OBD-II protocol is public and does not make any use of DBC files at all. Only certain emission-related sensors can be read. Body-related signals are not part of the OBD-II specification. Nevertheless, signals in the aforementioned specification are still available in the raw CAN protocol. However, one would still like to locate the CAN IDs and signal positions of emission-related signals on the CAN bus. For CAN injection attacks, one needs to know this information because the OBD-II protocol does not allow writing arbitrary values to these sensors.

Since any node can tap into the unencrypted CAN bus and start broadcasting data without prior authentication, a malicious entity can gain access to the in-vehicle network by using an OBD-II dongle as a CAN node and send messages (e.g., through a mobile app). If the message semantics (i.e., the DBC file(s) or portions thereof) are known to the attacker because they reverse-engineered the CAN bus, they can cause the vehicle to misbehave by affecting the operation of receiver ECUs. This can range from displaying false information on the instrument cluster to erroneously steering the vehicle. The latter impacts vehicle safety and, therefore, poses greater risk. Furthermore, it is also possible to cause certain ECUs to fail, possibly incurring operational/financial damage to the vehicle.

Theoretically, it is possible to monitor the traffic on all in-vehicle buses through the OBD-II interface. In practice, however, not all buses are mirrored out by the central gateway, which is responsible for routing CAN messages between buses or domains. This can be justified as a security countermeasure, but the OBD-II connector has only 16 pins, with some pins already assigned, and thus only up to three CAN buses can be monitored through the OBD-II port.

FIG. 4 provides an overview of an automated CAN message translator system 40. The CAN translator system 40 is comprised generally of three phases: signal extraction and alignment (phase 0), message translation (phase 1), and message identification (phase 2). Each of these phases is described in more detail below.

Three sets of signals serve as input to the CAN translator system 40. P is the set of IMU sensor data (called "motion sensors" in Android), i.e., 3-dimensional accelerometer and 3-dimensional gyroscope data collected from a smartphone (via the Torque Pro app) while recording OBD-II data (V). V is the of OBD-II data which consists of all OBD-II PIDs that the vehicle supports. The sampling rate depends on the used data collection dongle and vehicle. In one example, the data is resampled to 1 Hz. R is the set of raw CAN data that is recorded with the OpenXC dongle. The data set includes the entire trace of driving data broadcasted on the CAN bus and is accessible through the OBD-II port.

Phase 0 is primarily concerned with signal extraction and alignment. CAN messages can contain multiple signals, and hence one needs to extract the signals associated with each CAN ID. The signal extraction mechanism in this phase is built on top of the READ algorithm as described by Marcheti et. al. in "READ: Reverse Engineering of Automotive Data Frames" IEEE Transactions on Information Forensics and Security 14, 4 (April 2019) which is incorporated herein by reference. Using the rate at which the value of each bit changes, the READ algorithm determines signal boundaries under the assumption that lower-order bits in a signal are more likely to change more frequently than higher-order bits. The READ algorithm labels each extracted signal as either a counter, a cyclic redundancy check (CRC), or a physical value based upon other characteristics of the bit-change rate of the particular signal. For example, counters are characterized by a decreasing bit-flip rate, with the latter approximately doubling as the significance of the bit rises. Meanwhile, CRCs are characterized by a bit-change magnitude of approximately 0.

Physical signals (PHYS) are signals that do not fit into either of the above two categories. In this disclosure, three special types of physical signals are defined: UNUSED signals (all bits set to 0), CONST signals (all bits constantly set to the same value across messages, but with at least one bit set to 1), and MULTI signals (the value of the signal is from a set of n possible values).

In this disclosure, the mechanism of the READ algorithm is modified to determine signal boundaries. The original READ algorithm marks a signal boundary when the value of $[\log_{10} \text{Bitflip}]$ for a bit decreases as compared to the previous bit. However, the modified implementation of the READ algorithm instead checks whether the bit-flip rate decreased by a specific percentage from the previous bit—this value was set via an input parameter to the algorithm discussed below. In this implementation, pairs of consecutive bits whose bit-flip rates change from (>0.1 to <0.1), (>0.01 to <0.01), or (>0.001 to <0.001) would indicate a signal boundary. However, with the modification, a change in bit-flip rate from 0.9 to 0.2 would only indicate a boundary with any percentage threshold less than 77%. It was found that using a percentage decrease allowed one to extract more signals correctly than the original READ algorithm.

FIG. 5 is a flowchart of an example algorithm for implementing Phase 0. In a pre-processing stage 51, a CAN trace is parsed in order to obtain the bit-flip rate of each payload bit. To achieve this, the number of times the value of each bit changes in the payload of a given CAN ID is counted and then this number is divided by the number of messages in the trace with this CAN ID.

In Stage 0, the stage separates bits into three bins: UNUSED, CONST, and POSS signals (possibly a COUNTER, MULTI, CRC, or physical signal PHYS) as indicated at 52. This stage generates the preliminary signal boundaries and labels for each signal from the above three categories.

To achieve this, the bits from the previous stage are separated into two sets: those that change and those that do not. These bits are then grouped together into signals with preliminary boundaries, assigning the boundaries based upon where regions of bits that change transition regions of bits that do not, and vice versa. The regions of bits that change are assigned the preliminary label of POSS and are left to be processed later. Meanwhile, the bits that do not change are processed using Algorithm 1 below. Algorithm 1
Stage 0

```
procedure stage0(trace_file, T_{p0,0}, T_{P0,1})
    bits_that_dont_change_label←[ ]
    for l, r ∈ bits_that_dont_change do
        if True ∈ changes[l : r] then
            bits_that_dont_change_label.append(CONST)
            break
        else if r - l < T_{P0,0} then
            reinserted ← false
            for l_c, r_c ∈ bits_that_change do
                if l_c == r + 1 and r_c - l_c > T_{P0,1} then
                    l_c ← l
                    reinserted ← false
                    delete l, c
                    break
            if reinserted == false then
                bits_that_dont_change_label.append(UNUSED)
```

Two configurable parameters are defined for the algorithm, namely $T_{p0,0}$ and $T_{p0,1}$. The former is the length that a signal must have to be considered an unused signal. If a signal is shorter than this length, one can attempt to append it to the next signal. This is because one can assume that, if there is a short unused field, it actually contains the MSBs of the adjacent signal for which a change in value was not observed. For example, if 8 bits are used to express the speed in MPH, the most significant bit would not change unless the trace included driving over 128 mph). $T_{p0,1}$ is used to determine how long the next signal must be in order to have bits appended to it in this manner. This is necessary since it does not make sense to always re-append unchanging bits as the MSBs of the next signal.

In Stage 1, this stage is similar to the READ algorithm and evaluates all possible signal boundaries and their bit-flip rates as indicate at step 53. It iterates from the LSB of a signal to the MSB of the next adjacent signal, searching for a decrease in bit-flip rate. However, unlike the READ algorithm, this stage looks for a certain percentage decrease, denoted as $T_{p0,2}$. For example, if $T_{p0,2}$=10%, one would mark a signal boundary when the bit-flip rate decreases by greater than 10%. The output of this phase is an array of boundaries that contains all partitions within the boundaries of the previously marked POSS signals. This output contains the final signal boundaries that are used in the remainder of the evaluation.

In Stage 2, the stage evaluates all signal boundaries marked POSS and determines the number of unique values they contain throughout the trace as indicated at 54. To achieve this, the trace is parsed to determine the number of unique values that each extracted signal from Stage 1 is set to—if this number is less than a pre-determined threshold (Tp0, 3), the signal is not considered in future stages. Any remaining POSS signals at the end of this stage are marked as MULTI values. The output of this phase is a new signal labeling set, now additionally containing signals labeled as MULTI signals.

In Stage 3, this stage is also similar to the READ algorithm and evaluates any values still labeled as POSS to determine if their bit-flip rates resemble a counter as indicated at 55. If this is not the case, the signal is labeled as a PHYS value.

Phase 0 may also encompasses phone alignment. As FIG. 6 shows, the vehicular coordinate system is not necessarily consistent with the phone's coordinate system, particularly if the user moves their phone during the data-collection process. Therefore, it may be necessary to align these coordinate systems using rotation matrices. In order to avoid this additional step, it is suggested that users pre-align their phone with the vehicular coordinate system by mounting the phone inside their vehicle, e.g., in a phone/cup holder. Using the coordinate systems from FIG. 6, the phone should be located on the center console, with the short edge parallel to the direction of the vehicle's motion although other orientations may work as well.

FIG. 7 depicts a method for translating messages which may be implemented in Phase 1 of the CAN message translator system 40. The goal of this phase is to match the extracted signals from Phase 0 to openly available OBD-II PIDs (V), as well as mobile sensor data (P). The latter data can easily be collected using a smartphone. In an example embodiment, the OBD-II PIDs (V) and IMU sensors (P) considered from data collection with Torque Pro—make up the set S (see FIG. 4). Example signals in set S may include but are not limited to intake manifold pressure, ambient air temperature, speed, voltage (control module), turbo boost and vacuum gauge, fuel rail pressure, engine coolant temperature, torque, accelerator pedal position D, accelerator pedal position E, engine RPM, intake air temperature, engine load (absolute), absolute throttle position B, fuel flow rate, acceleration sensor (x axis), acceleration sensor (y axis). G(x), G(y), G(z), barometric pressure, altitude, and bearing. The commonality between these signals (i.e., V, P, and S) is that they are kinematic or powertrain related, i.e., they are captured while the vehicle is in motion. The OBD-II protocol was standardized for the purpose of capturing and diagnosing emissions data, which is powertrain-related. The IMU sensors capture the movement of the smartphone in the vehicle and therefore the movement of the vehicle, if the phone is fixed within the vehicle and properly aligned. These signals are also present on the CAN bus since this data is generated by and exchanged between ECUs, with a copy mirrored out to the OBD-II connector.

During a monitoring period, raw data sent over the vehicle network is received at 71 by a data analyzer of a computer. The raw data is first partitioned at 72 into a plurality of messages. Each message in the plurality of messages includes a message identifier. The plurality of messages are then grouped at 73 into multiple message groups, such that each message group includes messages with a unique message identifier amongst the plurality of message groups.

Concurrently, tagged data sent over the vehicle network during the monitoring period is also received at 74 by the data analyzer. In the example embodiment, the tagged data is the OBD-II data. Thus, the tagged data includes an identifier for a given vehicle parameter and is formatted in accordance with a standardized protocol, such as OBD-II protocol. It is noted that the raw data and the tagged data can be represented as a time series over the monitoring period.

Next, a similarity measure is determined at 75 between the tagged data and each message group in the plurality of message groups. As mentioned in relation to Eq. (2) above, CAN signals usually do not encode an absolute value, but instead a value with a linear relationship to the latter. As a result, comparing the temporal sequence of a raw CAN signal from set R and a signal from set S should yield a high cross-correlation value. In one embodiment, the similarity measure is made using cross-correlation. Hence, for each signal d∈S, run normalized cross-correlation (xcorr) with all extracted signals r∈R, which yields a list of cross-correlation values. Other types of similarity measures are also contemplated by this disclosure.

One or more message groups are identified at 76 as having a high correlation with the tagged data. In an example embodiment, the message groups are arranged in descending order according the similarity measure for the message group. That is, the message groups are arranged in a descending order with respect to the cross-correlation value. Message groups with the highest similarity are then selected. Since multiple CAN signals r can match a signal d (e.g., the four wheel speeds match the OBD speed), an intelligent cut-off point is defined that keeps those relevant signals d with a high correlation value, but deletes those starting with a correlation score that deviates significantly from the last signal d. For this purpose, define a threshold Tp1. In one example, Algorithm 2 below describes how to set the cut-off point.

---

Algorithm 2 - Defining the Cut-Off Point function Top_X(corr_result $T_{P1}$)
    running_sum, running_avg, cutoff ← corr_result [0]
    count ← 1
      for val ∈ corr_result[1 :] do

Algorithm 2 - Defining the Cut-Off Point

```
if val < (1 − T_p1) · running_avg then
    break
cuto f f · append(val)
running_sum ← summing_sum + val
count ← + 1 running_avg ← running_sum / count return cut o f f
```

In other words, the cutoff occurs where a difference between similarity measures for adjacent message groups exceeds a threshold. It is important to re-sample the two input sets R and S before running the cross-correlation so that both signals are temporally aligned.

Some of these signals are highly correlated with each other so that they can be matched to the same CAN signal extracted in Phase 0. For instance, engine load is a scaled version of the engine output torque. As a result, while generating a ground truth for each vehicle, one needs to consider these physical relationships and confirm that they indeed hold during the evaluation of Phase 1. The reason behind this lies in the xcorr function that was used in the aforementioned phase. It cannot distinguish between different physical signals as long as their temporal sequences are similar. See Appendix A for a complete summary of relationships between certain elements in set S.

Lastly, a data format for a given vehicle parameter is determined at 77, where the vehicle parameter is identified by the correlated tagged data. Apart from finding the correct CAN signal positions, the goal of Phase 1 is to output the scale (ms) and offset (ts) of each sensor (s). In an example embodiment, linear regression on the matched CAN signals R and signals from S is used to obtain these values. The latter can also be validated against the ground truth DBC file. To a greater extent, there is interest in comparing the matched signal positions from before against the ground truth in order to determine the accuracy of the algorithm in Phase 1. For this classification task, a confusion matrix is defined as shown in Table 1 below.

TABLE 1

Confusion Matrix for Phases 1 and 2

| | | Ground Truth | |
|---|---|---|---|
| | | Positive | Negative |
| Results from Phases 1 & 2 | Positive | TP<br>Phase 1: Signals that are correctly identified as part of the ground truth<br>Phase 2: Candidate CAN IDs that were correctly identified as being related to an event | FP<br>Phase 1: Signals that are incorrectly identified and are not part of the ground truth<br>Phase 2: Candidate CAN IDs that were incorrectly identified as being related to an event |
| | Negative | FN<br>Phase 1: Signals that are not identified, but are part of ground truth<br>Phase 2: CAN IDs that were incorrectly rejected during the filtering process | TN<br>Phase 1: Signals that are not identified, but are also not part of ground truth<br>Phase 2: CAN IDs that were correctly identified as not being related to an event |

Phase 2 is concerned with identifying message identifiers associated with a particular vehicle function. In an example embodiment, Phase 2 consists of a three-stage filtering process performed on snippets of CAN data recorded while performing body-related events. A listing of exemplary events $R_e$, e E include but are not limited to lock driver's side, lock passenger's side, unlock driver's side, unlock passenger's side, open trunk, close trunk, open driver's door, close driver's door, open passenger's door, close passenger's door, open door left back, close door left back, open door right back, close door right back, open driver's window, close driver's window, open passenger's window, close passenger's window, open window left back, close window left back, open window right back, close window right back, turn on heating, incremental fan speed increase, increase temperature incrementally 65-75 F, decrease temperature incrementally 75-65 F, incremental fan speed increase, air circulation button on, air circulation button off, honking horn, headlights off-on, headlights on-off, hazard lights on, hazard lights off, windshield wipers once, windshield wipers speed 1, windshield wipers speed 2, windshield wipers speed 3, interior lights all on, interior lights all off, windshield wiper fluid, left turn signal on, left turn signal off, right turn signal on, right turn signal off, activate parking break, release parking break, open hood, close hood, driver's side mirror left right up down, passenger's side mirror left right up down, buckle driver, unbuckle driver.

FIG. 8 provides an overview of this filtering process. Reference data sent over the vehicle network is captured at 81. In the example embodiment, a reference snippet $R_0$ was recorded while the vehicle's engine/ignition was off, but with accessory power on. No vehicle functions are performed in the vehicle while the reference data is recorded. A reference state, used later in the filtering process, was generated using this snippet. How to generate the reference state from $R_0$ is further described blow.

In Eq. (3), count the number of bit-flips ($BFC_j$) in consecutive messages $m_{n,i,j} \in id_n$ for that particular CAN ID ($id_n$) in each of its 64 bit-positions $j \in [0, 63]$:

$$BFC_{n,j} = \sum_{i=0}^{|id_a|-1} 1, \forall j \in [0, 63] \text{ and if } m_{n,i,j} \neq m_{n,i-1,j}. \quad (3)$$

Then, define the bit-flip array ($BFA_{n,j}$) for a particular CAN ID ($id_n$) in each of its bit positions:

$$BFA_{n,j} = \frac{BFC_{n,j}}{|id_n|}. \quad (4)$$

Finally, define the bit-flip rate ($BFR_n$) of a CAN ID ($id_n$) as:

$$BFR_n = \frac{\sum_{j=0}^{63} BFA_{n,j}}{64}. \quad (5)$$

Note that the above bit-flip rate $BFR_n$ is different from the one defined in Phase 0. The reference state contains a mapping of CAN IDs $id_n$ to message payloads that have a bit-flip rate lower than, or equal to a threshold $T_{p2,0}$ ($BFR_n$ $T_{p2,0}$), since messages that change less frequently are more likely to be constant or alternating between a few constant states. Messages that change more frequently, as evidenced by $BFR_n > T_{p2,0}$, are less likely to be associated with a single body-related event, especially because the reference snippet $R_0$ was recorded without any human interaction in the vehicle that could have triggered body events.

Additionally, event data sent over the vehicle network while a particular vehicle function is performed in the vehicle is captured at 83. Event data is also recorded while the vehicle engine is off.

FIG. 9 illustrates an example of the filtering process in Phase 2. The event snippet is shown in the TRACE section and the generated reference state is shown in the REFERENCE section. After generating the reference state, each event snippet $R_e$ was filtered through three separate stages, each designed to independently identify potential candidate CAN IDs. The order of these filtering stages was set based upon extensive evaluation to achieve the highest accuracy. Stages 1, 2, and 3 operate under the assumption that body-related events should trigger visible and immediate changes in the messages broadcast on the CAN bus.

With continued reference to FIGS. 8 and 9, stage 1 filters messages with constant payloads. Assume that body-related events should trigger changes in message payloads for at least one CAN ID, so all CAN IDs whose payloads did not change throughout the snippet are removed as indicated at 85. As an example, in FIG. 9, messages with a CAN ID of 300 were filtered out at this stage because all payloads sent in the event snippet were the same.

Stage 2 filters messages present in the reference state as indicated at 86. That is, candidate messages are removed if their CAN IDs and payloads matched a (CAN ID, payload) pair found in the reference state. If a candidate's payload from the event snippet was identical to the reference state, when no body-related events occurred, it is highly unlikely this message was sent due to a change in the state of the vehicle's body. This stage can be considered a diff between the reference state and each event $R_e$. In FIG. 9, messages with the (CAN ID, payload) pairs (400, 056089000A00A000) and (600, 000000024CB016EA) were filtered out because they were present in the reference state. Furthermore, better results were obtained by rejecting candidates whose CAN IDs were not present in the reference state.

Stage 3 filters messages which were likely powertrain-related as indicated as 87. To reduce the quantity of remaining candidates, those CAN IDs that were identified as potential candidates for powertrain-related events in Phase 1 were also removed. This was possible since there was little overlap between the events being identified in both phases. To minimize the removal of candidates that were mistakenly classified as powertrain-related in Phase 1, removed CAN IDs were removed only if their correlation scores from Phase 1 were higher than a threshold ($T_{p2,3}$). The correlation scores for each CAN ID in the example in FIG. 9 can be observed in the section POWERTRAIN. In such a situation, messages were filtered out at this stage if their correlation scores were greater than 0.80.

Finally, those messages that were not filtered out are considered the candidates for that particular event snippet and linked to the associated event (i.e., vehicle function) as indicated at 88. In FIG. 9, the (CAN ID, payload) pairs that were not filtered out are labeled CANDIDATE in the TRACE section. Eventually, the results obtained from the intelligent filtering algorithm were compared against the ground truth. As in Phase 1, a ground truth needs to be created from manual inspection of the DBC files for each test vehicle—a confusion matrix is defined for this classification task in Table 1.

Four vehicles are used for an evaluation, all from the same OEM: Vehicle A is a 2017 luxury mid-size sedan, Vehicle B is a 2018 compact crossover SUV, Vehicle C is a full-size crossover SUV while Vehicle D is a full-size pickup truck. DBC files were acquired for all four vehicles and used as the ground truths against which to compare the results of LibreCAN. Vehicles A, C and D have at least two HS-CAN buses, both of which are routed out to the OBD-II connector, whereas Vehicle B has at least one HS-CAN and one MS-CAN, with only the former being accessible via OBD-II. Two types of data were collected: free driving data for an hour with each vehicle (for Phase 1) as well as event data for reverse-engineering body-related events (for Phase 2). For the former, data was collected through the OBD-II port with two devices: an ELM327 dongle and an OpenXC dongle. A Y-cable was used to allow both devices to connect to the port at the same time, allowing one to gather raw CAN data via the OpenXC dongle, while simultaneously gathering OBD-II data and smartphone data via the ELM327 dongle. The recorded CAN dump consists of raw JSON data with CAN message metadata such as the CAN ID and timestamp, along with the payload data. A Torque Pro Android app was used to interface with the ELM327 dongle via Bluetooth. This produced a CSV file with around 22 signals d∈s, containing both OBD-II PIDs V as well as mobile sensor data P. For Phase 2, the OpenXC dongle was used to record raw CAN data.

Several parameters were introduced above for each phase x are denoted as $T_{px,y}$, where y is an incremental number. Besides tuning these parameters to achieve the highest accuracy, another design goal is to find a set of parameters for each vehicle—henceforth called parameter configuration—that does not significantly differ from the configuration of other vehicles. In a real-world use case of LibreCAN, DBC files are not available, and thus the parameters cannot be tuned to achieve optimal performance. Thus, the existence of a universal configuration is presented that can achieve good performance on any vehicle without any prior knowledge of its architecture or DBC structure.

To evaluate how well our implementation and enhancements to the READ algorithm's extracted signal boundaries, the boundaries produced by Phase 0 are compared with the ground truth boundaries extracted from the DBC files for both vehicles. To find the optimal values of the four parameters defined above, a brute-force search was performed through all possible combinations as depicted in Table 3. For Phase 0, optimal was defined as the total number of correctly extracted signals (CE). All parameter configurations are sorted in a descending list by this metric. For the maximum number of CE, these configurations among all four vehicles were inspected for similarity and the configurations with the smallest distance to each other were selected. As shown in the first four columns of Table 3, the numbers of each 4-tuple configuration are very close to each other.

The results of the run with the optimal parameters for Phase 0 are summarized in Table 2. It shows the number of correctly extracted signals (CE) that we optimized our parameter configurations for, the number of total extracted signals (TE) and the total number of signals in the DBC files (TDBC). Note that Vehicle B has a lower number of TDBC since one can only reverse-engineer one CAN bus (the second one is not available through the OBD-II port). Define two ratios: CE/TE and TE/TDBC. The latter can be defined as reverse-engineering coverage. LibreCAN can always extract more than half of the available signals, with varying success for the number of correctly extracted signals. There are multiple reasons for these less than desirable numbers.

TABLE 2

Phase 0 Elevation Metrics

| Veh. | Correctly Extracted (CE) | Total Extracted TE) | Total in DBC (TDBC) | CE/TE | TE/TDBC |
|---|---|---|---|---|---|
| Veh A | 308 | 846 | 1640 | 36.4% | 51.6% |
| Veh B | 96 | 453 | 829 | 21.0% | 54.6% |
| Veh C | 208 | 698 | 1236 | 29.8% | 56.5% |
| Veh D | 251 | 828 | 1327 | 30.0% | 62.4% |

First, not all signals can be triggered in the recordings. Although both free driving and event data are used for signal extraction in Phase 0, it is impossible to capture everything, e.g., deployed airbags or emergency call signals. Since all of the evaluation vehicles were newer with several features and also not the highest trim level for that particular model, the number of functionalities and thus signals is relatively higher than an older vehicle. This explains the TE/TDBC ratio. Second, it is not always possible to match the exact signal boundaries to the ground truth DBC file. For instance, the engine speed (RPM) range can go up to 8000 RPM in most vehicles. Under normal driving conditions with an automatic transmission, the vehicle will shift to the next gear in the range of 2000-3000 RPM. As a result, one will miss the most significant bits of that particular signals. The same applies to another physical signals, such as vehicle speed or engine coolant temperature. This will intrinsically result in a low CE/TE ratio.

As a result, the aforementioned ratio in Table 2 should not be used to draw conclusions about the performance of LibreCAN since the signals inspected in Phases 1 and 2 yield high accuracy numbers.

Next, the accuracy of Phase 1 was analyzed both independently from Phase 0 (using correct signal boundaries from the DBC files) in order to avoid possible error propagation, as well as with the extracted signal boundaries from Phase 0. Using the terminology from the confusion matrix in Table 1, the following metrics are defined to assess for Phase 1:

$$\bullet \text{Accuracy} = \frac{TP + TN}{TP + TN + FP + FN}$$

$$\bullet \text{Precision} = \frac{TP}{TP + FP}$$

$$\bullet \text{Recall} = \frac{TP}{TP + FN}$$

In Phase 1, one parameter was introduced that can be tuned to achieve the best performance. This parameter is the threshold $T_{p1}$ to define the cut-off point, defined previously. One mechanism to define the optimal value for $T_{p1}$ is via the Receiver Operating Characteristic (ROC) curve. Since we have an unbalanced ground truth (e.g., the speed contains more CAN signals r than altitude), a Precision-Recall (PR) curve is a better option. FIG. 10 shows the PR curve for both vehicles. Each data point depicts a value of $T_{p1} \in [0, 1]$.

The closest data point to the upper right corner delivers the optimal threshold $T_{p1}$ for the best performance. The PR curve depicted in FIG. 10 does not have an ideal shape for Vehicles A, B and C because the recall value never exceeds 0.55. According to the above definition of recall, this means that the True Positives (TP) are always smaller than the number of False Negatives (FN), i.e., the ground truth contains CAN signals that can never be found by our algorithm. Since the ground truth is a subjective interpretation which is generated by manual inspection of the DBC files, one can assume that some CAN signals r are unrelated to the analyzed signal d. This is a limitation of this work since we could not receive the OEM's help in interpreting the DBC files. Some examples where this phenomenon was encountered are the z-component of accelerometer, altitude and bearing (all from phone). The former two can be explained by the fact that all our driving took place in a relatively flat area without many hills. The latter could be caused by GPS issues since bearing is collected from the phone's GPS module.

The first part of Table 4 sums up the precision and recall values using the optimal threshold $T_{p1}$ (see Table 3) obtained from the PR curve analysis. The precision and recall values reflect the evaluation of Phase 1 with correct bounds in

TABLE 4

Phases 1 and 2 Evaluation Metrics

| | Phase 1 | | | Phase 2 | |
|---|---|---|---|---|---|
| | Prec. | Recall | Acc. | Prec. | Recall |
| Vehicle A | 82.6%/77.2% | 44.1%/41.8% | 88.0% | 8.9% | 58.2% |
| Vehicle B | 66.7%/61.1% | 26.4%/25.6% | 90.1% | 8.5% | 46.2% |
| Vehicle C | 74.4%/78.1 | 45.7%/44.9% | 91.5% | 11.7% | 51.6% |
| Vehicle D | 79.7%/70.8% | 61.8%/57.3% | 95.1% | 15.0% | 47.2% | the first line and with the signal bounds from Phase 0 in the second. The latter values are shown to be slightly lower for all vehicles, with the exception of Vehicle C. High precision values mean that most of the identified signals are part of the ground truth, whereas relatively low recall values mean that we cannot match the majority of signals defined in the subjective ground truth due to the high number of FNs, as mentioned previously.

The anomaly for Vehicle C can be explained as follows: with more signals available for the run with correct boundaries, Phase 1 over-identifies signals and causes a higher number of false positives for that specific vehicle. This is certainly possible.

TABLE 3

Optimal Parameters in LibreCAN

| | Tp0,0 [0,64] | Tp0,1 [0,64] | Tp0,2 [0,1] | Tp0,3 [0,64] | Tp1 [0,1] | Tp2,0 [0,.1] | Tp2,3 [.2,1] |
|---|---|---|---|---|---|---|---|
| Veh. A | 0 | 3 | 0.02 | 2 | 0.05 | 0.03 | 0.70 |
| Veh. B | 2 | 3 | 0.01 | 2 | 0.07 | 0.03 | 0.70 |
| Veh. C | 0 | 4 | 0.01 | 2 | 0.05 | 0.03 | 0.55 |
| Veh. D | 2 | 3 | 0.01 | 2 | 0.06 | 0.02 | 0.60 |

The goal of Phase 2 was to identify CAN IDs that were likely associated with a body-related event defined in Table 10. To evaluate the results of the CAN message translator, metrics, such as accuracy, precision, and recall, were used. To evaluate these metrics, one needs to revisit the terms from the confusion matrix in Table 1. Note that this is a coarser-grained analysis than Phase 1.

The three-stage filtering process uses two input parameters that were defined above: (1) the bit-flip threshold ($T_{p2,0}$), used to generate the reference state and (2) the powertrain minimum correlation score ($T_{p2,3}$), used in the powertrain filtering stage.

The collected event traces were run through Phase 2 for each parameter configuration, calculating the accuracy, precision, and recall metrics for each event. Since the goal was to facilitate the identification of potential candidate CAN IDs, those parameters that resulted in a high FP rate were preferred instead of a high FN rate—to avoid excluding a potential candidate from consideration. The optimal parameter values discovered for each vehicle are shown in the last two columns of Table 3.

The second part of Table 4 summarizes the mean values of the metrics for all 53 events while FIG. 11 shows the median number of CAN IDs remaining after each filtering stage (per event), as well as the total number of ground truth CAN IDs lost over all events at each filtering stage. As predicted, accuracy is high since we filter out most unrelated CAN IDs for each event, whereas precision is relatively low. The latter metric indicates the ratio of correct CAN IDs in the candidate set to the total number of candidates. However, low precision is not considered to be an issue. As FIG. 11 shows, one can reduce the number of CAN IDs after three filtering stages by more than 10×, despite losing some correct CAN IDs at each stage.

An important metric for demonstrating the feasibility of LibreCAN is the level of automation available, compared with the amount of manual effort required on the part of the user. Although all three phases in the system can run and generate results without human intervention, there is still manual effort required to collect input traces. The goal of LibreCAN is to enable every user to reverse-engineer the CAN message format of their vehicle with as little effort as possible. Hence, it is desirable to assess how much data has to be collected for Phase 1 to yield a reasonable precision and how long it takes to record all 53 of the events used in Phase 2.

The recorded traces of all evaluation vehicles were around 60 minutes long. The precision reported above reflects the entire re-sampled trace but how would a shorter recording affect this metric. Phase 1 was rerun with signals obtained in Phase 0, with 25%, 50% and 75% of the trace length. In order to avoid a bias towards more city or highway driving, the precision was calculated for overlapping segments of this trace. For instance, to analyze recordings of only half the length of the original trace, evaluate the following segments of the trace: (1) the first half of the trace, (2) the slice of the trace between the first and last quarters of its length, and (3) the last half. The mean results of these evaluations are plotted in FIG. 12.

A reduction in trace length results in a slight precision drop for all vehicles except Vehicle B. Vehicle B exhibits different behavior because a significantly higher number of signals were extracted with its 100% trace compared to this trace in the other vehicles we evaluated—since a greater number of signals were extracted in Phase 0, a greater number signals were processed in Phase 1. Both the 75% and 100% traces for this vehicle yielded the same number of correct signals (our design goal in Phase 0), but the 100% trace resulted in more signals being processed (due to a higher number of total extracted signals), which increased the number of false positives and thus decreased the resulting precision. In order to achieve at least 65% precision, it is recommended to a trace covering 30 minutes or more.

In order to assess the time required to record all 53 events listed in Table 10, a human-study experiment was conducted, for which an IRB approval (Registration No. REDACTED) was obtained. For this purpose, an Android app was developed that ran on top of CarLab. The participant was required to interact with this app, which loops through all 53 events, displaying them one at a time on the screen. A timer begins with the start of recording for the first event and the participant, seated in the driver's seat, is instructed to perform each event and then click the Next Event button. The timer stops after the last event has been performed. During the experiment, a member of the study team sat in the passenger seat and evaluated participant's performance of the events, namely if one was performed incorrectly or skipped.

A total of ten people participated in this experiment. They were instructed on how to operate the app and were not allowed to ask questions once the experiment began. After completing all events, the team member recorded how long the participants took and asked them how familiar they were with the test vehicle (Vehicle A) on a scale from 1 to 5, with 5 being the most familiar. FIG. 13A summarizes the correlation between the level of experience with the time span. Note that the completion time was not affected much by the experience level, except for one totally inexperienced (1/5) and one very experienced (5/5) participant. Specifically, for users with experience levels ranging from 2 to 4, the median of their completion time varies between 9.0 to 10.4 minutes. FIG. 13B shows the key behavioral metrics (i.e., number of mistakes and skips) of all participants. The median numbers of mistakes and skips are 3.5 and 1, respectively. As a result, drivers of different experience levels are capable of performing all 53 events with the median rates of error and skip at 6.6% (=3.5/53) and 1.9%, respectively.

It was concluded that a 30 minute drive for Phase 1 and a 10 minute experiment session inside the vehicle for Phase 2 are sufficient to produce good results. These numbers are feasible for an otherwise completely automated CAN reverse-engineering framework, especially given the time that manual reverse-engineering would likely take. The latter can take from days to weeks, given the detail and precision of the reverse-engineering needed. Although no explicit times are reported for manual reverse-engineering, tutorials imply significant effort is required.

Computation time of all three phases are also analyzed individually. All experiments were conducted using Python 3 on a computer running 64-bit Ubuntu 16.04. This computer featured 128 GB of registered ECC DDR4 RAM and two Intel Xeon E5-2683 V4 CPUs (2.1 GHz with 16 cores/32 threads each). Phase 0 utilizes all available computational resources (64 threads), whereas Phase 1 uses one thread per signal d plus one main thread (23 threads). Meanwhile, the computationally inexpensive Phase 2 runs in a single thread.

Table 5 reports the time required for all computation steps. Note that these values have been generated for a run with the optimal parameter configuration. The total runtimes include operations that finished in less than one second, which are listed as completing in 0 seconds in Table 5.

The entire three phase automated process takes 79 seconds for Vehicle A, 74 seconds for Vehicle B, 70 seconds for Vehicle C and 72 seconds for Vehicle D. All vehicles have a similar computation time, indicating that LibreCAN is highly efficient in reverse-engineering a vehicle's CAN bus (slightly more than 1 minute) with only a small amount of manual effort (around 40 minutes).

As mentioned before, LibreCAN was designed to achieve a good performance with a universal set of parameters in all three phases. In order to show that anyone can achieve a comparable performance as reported in the previous subsections without a priori knowledge of the parameters, we would like to introduce an accuracy analysis similar to the above. Since one of the design goals was to select similar parameters among the four evaluation vehicles, one can now pick any configuration of these four vehicles for testing. All four vehicles were evaluated on parameters $T_{p0,0}=2$, $T_{p0,1}=3$, $T_{p0,2}=0.01$, $T_{p0,3}=2$, $T_{p1,0}=0.05$, $T_{p2,0}=0.03$, and $T_{p2,4}=0.70$. The results are summarized in Table 6. A comparison with the optimal results for each vehicle in Table 4 shows that they are relatively similar. Through the design goals as well as exhaustive evaluation on four vehicles, a parameter configuration was found that can produce favorable results for any testing vehicle. This corroborate the scalability of LibreCAN.

TABLE 5

Summary of Computation time in each phase and stage (units are in seconds)

| Phases | Stages | Veh A | Veh B | Veh C | Veh D |
| --- | --- | --- | --- | --- | --- |
| Phase 0 | Parse Raw CAN File | 11 | 12 | 9 | 9 |
| | Split Trace | 2 | 2 | 2 | 2 |
| | Remove Unused Columns | 0 | 0 | 0 | 0 |
| | Extract Signals | 4 | 9 | 5 | 5 |
| | Move Small Files | 0 | 0 | 0 | 0 |
| | Total | 17 | 23 | 16 | 16 |
| Phase 1 | Run Correlate | 40 | 30 | 36 | 40 |
| | Calculate Scale and Offset | 17 | 18 | 16 | 13 |
| | Total | 57 | 48 | 52 | 53 |
| Phase 2 | Create Ref. State | 0 | 0 | 0 | 0 |
| | Filter Constant Messages | 4 | 2 | 2 | 3 |
| | Compare to Ref. State | 0 | 0 | 0 | 0 |
| | Filter Powertrain Related Messages | 0 | 0 | 0 | 0 |
| | Total | 5 | 3 | 2 | 3 |
| LibreCAN | Total | 79 | 74 | 70 | 72 |

TABLE 6

Phases 1 and 2 Evaluation Metrics for Generic Parameters

| | Phase 1 | | | Phase 2 | |
| --- | --- | --- | --- | --- | --- |
| | Prec. | Recall | Acc. | Prec. | Recall |
| Vehicle A | 77.2% | 41.8% | 88.0% | 8.9% | 58.2% |
| Vehicle B | 65.9% | 22.5% | 90.1% | 8.5% | 46.2% |
| Vehicle C | 78.1% | 44.9% | 91.5% | 11.7% | 51.6% |
| Vehicle D | 72.5% | 56.2% | 94.6% | 13.7% | 47.2% |

The main use-case of LibreCAN is as a tool for security researchers or (white-hat) hackers. It can help them lower the car-hacking barrier and allow vulnerabilities to be exploited faster. Another potential use-case envisioned for LibreCAN is as a utility to enable the development of apps for vehicles, both in industry and academia.

Big data generation and sharing will lead to the monetization of driving data and create an additional source of revenue for OEMs and services. According to PwC, by 2022 the connected car space could grow to $155.9 billion, up from an estimated $52.5 billion in 2017. OEM-independent, universal access to data by third-party service providers can make the latter a major player in automotive data monetization. Third-parties already offer OBD-II dongles that can access the in-vehicular network and obtain publicly available data (OBD-II PIDs). In particular, usage-based insurance (UBI) companies are known to distribute dongles to track driving behavior, allowing them to adjust insurance premiums. As mentioned previously, CAN data contains richer information than OBD-II PIDs and can be leveraged to build more powerful third-party apps. This also encompasses academic research, which usually has limited knowledge about vehicular data collection.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for translating messages sent over a vehicle network, comprising:
   receiving, by a computer processor, raw data sent over the vehicle network during a monitoring period;
   partitioning, by the computer processor, the raw data into a plurality of messages, where each message in the plurality of messages includes a message identifier;
   grouping, by the computer processor, the plurality of messages into multiple message groups, where each message group includes messages with a unique message identifier amongst the plurality of message groups;
   receiving, by the computer processor, tagged data sent over the vehicle network during the monitoring period, where the tagged data includes an identifier for a given vehicle parameter and is formatted in accordance with a standardized protocol;
   determining, by the computer processor, a similarity measure between the tagged data and each message group in the plurality of message groups;
   identifying, by the computer processor, one or more message groups in the plurality of message groups having a high correlation with the tagged data; and
   determining, by the computer processor, a data format for the given vehicle parameter in the plurality of messages from the one or more identified message groups.

2. The method of claim 1 wherein the tagged data and the raw data for each of the plurality of messages is represented as a time series over the monitoring period.

3. The method of claim 1 further comprises determining a similarity measure between the tagged data and each message group in the plurality of message groups using cross-correlation.

4. The method of claim 1 further comprises temporally aligning the tagged data with the plurality of message groups prior to the step of determining a similarity measure.

5. The method of claim 1 wherein identifying one or more message groups further comprises arranging the message groups in the plurality of message groups in a descending order according the similarity measures for the message groups; and selecting the one or more message groups with the highest similarity measures, such that a cutoff for the one or more message groups occurs where a difference between similarity measures for adjacent message groups exceeds a threshold.

6. The method of claim 1 further comprises determining a data format for the given vehicle parameter in the plurality of messages using linear regression, where the data format for the given vehicle parameter includes a scale and an offset.

7. The method of claim 1 further comprises
   capturing, by a computer processor, reference data sent over a vehicle network of a vehicle while an engine of the vehicle is off and no vehicle functions are performed in the vehicle;
   partitioning, by the computer processor, the reference data into a plurality of reference messages to form a reference state, where each message in the plurality of reference messages includes a message identifier and payload data;
   capturing, by the computer processor, event data sent over the vehicle network while a particular vehicle function is performed in the vehicle and an engine of the vehicle is off;
   partitioning, by the computer processor, the event data into a plurality of candidate messages, where each message in the plurality of candidate messages includes a message identifier and payload data;
   removing, by the computer processor, candidate messages from the plurality of candidate messages, where the payload data from the candidate messages removed from the plurality of candidate messages matches payload data for at least one of the references messages in the plurality of references messages;
   identifying, by the computer processor, additional candidate messages in the plurality of candidate messages, where the message identifier and the payload data is the same amongst the additional candidate messages;
   removing, by the computer processor, additional candidate messages from the plurality of candidate messages; and
associating, by the computer processor, message identifiers for messages remaining in the plurality of candidate message with the particular vehicle function.

8. The method of claim 7 further comprises
   receiving, by the computer processor, raw data sent over the vehicle network during a monitoring period;

partitioning, by the computer processor, the raw data into a plurality of messages, where each message in the plurality of messages includes a message identifier;

grouping, by the computer processor, the plurality of messages into multiple message groups, where each message group includes messages with a unique message identifier amongst the plurality of message groups;

receiving, by the computer processor, tagged data sent over the vehicle network during the monitoring period, where the tagged data includes an identifier for a given vehicle parameter and is formatted in accordance with a standardized protocol;

determining, by the computer processor, a similarity measure between the tagged data and each message group in the plurality of message groups;

identifying, by the computer processor, one or more message groups in the plurality of message groups having a high correlation with the tagged data; and removing, by the computer processor, further candidate messages from the plurality of candidate messages prior to the step of associating message identifiers with the particular vehicle function, where message identifiers for the further candidate messages match at least one message identifier for messages in the one or more message groups.

9. The method of claim 7 wherein the particular vehicle function is selected from a group consisting of lock driver door, unlock driver door, lock passenger door, unlock passenger door, open driver door window, close driver door window, open passenger door window, close passenger door window, right turn signal on, right turn signal off, left turn signal on, left turn signal off, headlights on, headlights off, open hood, and open trunk.

10. The method of claim 1 wherein the tagged data is captured using an on-board diagnostic tool.

11. A computer-implemented method for identifying message identifiers associated with a particular vehicle function, comprising:

capturing, by a computer processor, reference data sent over a vehicle network of a vehicle while an engine of the vehicle is off and no vehicle functions are performed in the vehicle;

partitioning, by the computer processor, the reference data into a plurality of reference messages to form a reference state, where each message in the plurality of reference messages includes a message identifier and payload data;

capturing, by the computer processor, event data sent over the vehicle network while a particular vehicle function is performed in the vehicle and an engine of the vehicle is off;

partitioning, by the computer processor, the event data into a plurality of candidate messages, where each message in the plurality of candidate messages includes a message identifier and payload data;

removing, by the computer processor, candidate messages from the plurality of candidate messages, where the payload data from the candidate messages removed from the plurality of candidate messages matches payload data for at least one of the references messages in the plurality of references messages;

identifying, by the computer processor, additional candidate messages in the plurality of candidate messages, where the message identifier and the payload data is the same amongst the additional candidate messages;

removing, by the computer processor, additional candidate messages from the plurality of candidate messages; and associating, by the computer processor, message identifiers for messages remaining in the plurality of candidate message with the particular vehicle function.

12. The method of claim 11 further comprises receiving, by the computer processor, raw data sent over the vehicle network during a monitoring period;

partitioning, by the computer processor, the raw data into a plurality of messages, where each message in the plurality of messages includes a message identifier;

grouping, by the computer processor, the plurality of messages into multiple message groups, where each message group includes messages with a unique message identifier amongst the plurality of message groups;

receiving, by the computer processor, tagged data sent over the vehicle network during the monitoring period, where the tagged data includes an identifier for a given vehicle parameter and is formatted in accordance with a standardized protocol;

determining, by the computer processor, a similarity measure between the tagged data and each message group in the plurality of message groups;

identifying, by the computer processor, one or more message groups in the plurality of message groups having a high correlation with the tagged data; and removing, by the computer processor, further candidate messages from the plurality of candidate messages prior to the step of associating message identifiers with the particular vehicle function, where message identifiers for the further candidate messages match at least one message identifier for messages in the one or more message groups.

13. The method of claim 11 wherein the particular vehicle function is selected from a group consisting of lock driver door, unlock driver door, lock passenger door, unlock passenger door, open driver door window, close driver door window, open passenger door window, close passenger door window, right turn signal on, right turn signal off, left turn signal on, left turn signal off, headlights on, headlights off, open hood, and open trunk.

* * * * *